United States Patent
Goldberg et al.

(10) Patent No.: US 7,897,925 B2
(45) Date of Patent: Mar. 1, 2011

(54) SYSTEM AND METHOD FOR HIGH Z MATERIAL DETECTION

(75) Inventors: Jacques Goldberg, Haifa (IL); Isaac Shpantzer, Bethesda, MD (US); Yaakov Achiam, Rockville, MD (US); Nadejda Reingand, Baltimore, MD (US)

(73) Assignee: CeLight, Inc., Silver Spring, MD (US)

( * ) Notice: Subject to any disclaimer, the term of this patent is extended or adjusted under 35 U.S.C. 154(b) by 368 days.

(21) Appl. No.: 12/272,780

(22) Filed: Nov. 17, 2008

(65) Prior Publication Data
US 2009/0224157 A1    Sep. 10, 2009

Related U.S. Application Data

(63) Continuation-in-part of application No. 11/626,920, filed on Jan. 25, 2007, now Pat. No. 7,652,254, and a continuation-in-part of application No. 11/947,058, filed on Nov. 29, 2007, now Pat. No. 7,470,905.

(60) Provisional application No. 61/013,791, filed on Dec. 14, 2007.

(51) Int. Cl.
*G01N 23/00*    (2006.01)
*G01N 23/201*   (2006.01)

(52) U.S. Cl. .................. 250/358.1; 250/251; 250/336.1; 250/397

(58) Field of Classification Search .............. 250/251, 250/336.1, 358.1, 397
See application file for complete search history.

(56) References Cited

U.S. PATENT DOCUMENTS

| | | | |
|---|---|---|---|
| 6,646,274 B1 * | 11/2003 | Bleeker ...................... | 250/492.2 |
| 6,727,503 B1 * | 4/2004 | Gerstenmayer .......... | 250/370.09 |
| 7,015,475 B2 * | 3/2006 | Hailey ........................ | 250/358.1 |
| 7,183,554 B2 * | 2/2007 | Gallagher et al. ......... | 250/358.1 |
| 7,301,150 B2 * | 11/2007 | Hailey ........................ | 250/358.1 |

\* cited by examiner

*Primary Examiner* — David A Vanore
(74) *Attorney, Agent, or Firm* — Nadya Reingand

(57) ABSTRACT

A method and system for high Z material revealing using muon detection technique is presented. The system measures muons' coordinates, velocities, incidence angles and leaving angles. Two series of detectors: one above and one below the interrogated volume are used. A muon trajectory deviation from an expected trajectory is used for the decision making on the presence of high Z material inside the volume. The muon velocity is measured using either a ring Cerenkov counter, a transition radiation detector or/and a threshold Cerenkov counter. The expected trajectory is calculated basing on known particle velocity.

20 Claims, 5 Drawing Sheets

SYSTEM AND METHOD FOR HIGH Z MATERIAL DETECTION

CROSS-REFERENCE TO RELATED APPLICATIONS

The present invention claims the benefit of U.S. Provisional Application Ser. No. 61/013,791, filed Dec. 14, 2007; the present invention is a continuation-in-part of U.S. patent application Ser. Nos. 11/626,920, filed Jan. 25, 2007 now U.S. Pat. No. 7,652,254 and 11/947,058, filed Nov. 29, 2007 now U.S. Pat. No. 7,470,905, all of which are fully incorporated herein by reference.

FIELD OF INVENTION

This invention relates generally to the systems and methods for revealing hidden uranium, plutonium and other high Z materials using muon detection technique.

BACKGROUND OF THE INVENTION

A flow of cosmic rays constantly bombards Earth. Primary cosmic rays consist of single protons (about 90% of all cosmic rays) and alpha particles (majority of the remaining 10%). When these primary cosmic rays hit Earth's atmosphere at around 20,000 m above the surface, the impacts cause nuclear reactions, which produce pions. These pions decay into a muon and muon neutrino at about 9000 m altitude. Many muons decay on the way down into neutrinos and an electron while others reach the surface, and there are still enough particles to be detected fairly easily. About 7,200 muons rain down on each square meter of Earth every minute. This flux is approximately uniform over the Earth's surface.

Muons are electrically charged unstable elementary particles with a mean energy of about 3 GeV, which rain down upon the surface of the earth, traveling at almost the speed of light. The muon has an average half-life of $2.2 \cdot 10^{-6}$ s and weight of $1.88\sqrt{10^{-28}}$ kg. The angular distribution of the muons is proportional to $\cos^2 \alpha$, where $\alpha$ is calculated from the vertical direction.

Cosmic muons observed at sea level come from the decay of unstable pions produced in the upper part of the atmosphere in amounts decreasing with decreasing altitude starting downwards from about 20,000 meters. These pions are produced in nuclear collisions with the air of extraterrestrial protons and a small amount of other nuclei. The muons are not monoenergetic. FIG. 1 shows the most recent and most accurate measurements of the momentum p of the muons, presented by David Gertsle in "Cosmic ray flux study", Oct. 17, 2007. Here muon energy E is related to the momentum and the muon mass m by Einstein's formula $E^2 = p^2 + m^2$.

Various detection techniques were proposed for muons detectors. Muon detectors described below are presented here for the purpose of proof of the systems feasibility. However it does not limit the concept of the present invention to this particular type of detectors.

Cloud chambers with supersaturated vapor and bubble chambers with high pressure liquid were widely used in the past. They allow visualizing the muon trajectory. If the chamber is equipped with a three-dimensional coordinate system, the muon incident angle and coordinate can be measured. Thick layers of photoemulsion were the first detectors used to the muon registration.

The most suitable types of muon detectors for the current system are wire chambers and drift chambers. The wire chambers consist of very large number of parallel wires, where each wire acts as an individual detector. A particle leaves a trace of ions and electrons, the latter drift toward the nearest wire. By marking off the wires which had a pulse of current, one can see the particle's path. Several planes of wires with different orientations are used to determine the position of the particle very accurately. One embodiment of wire chamber detectors is shown in FIG. 2. Typically the chamber 1 has two windows 2 and 2a. Gas pump 3 is connected with the chamber by inlet and outlet pipes 4 and 5. Three wire gratings are inserted between the windows: two cathode wire planes 6 and 7 and a sense wire plane 8 located in between. Output 9 yields a signal caused by a muon passing through the chamber. Varying voltages applied from the source 10 to the anode wires produce a field in which ionization electrons cause an avalanche towards the nearest sense wire. Additionally the wire detector can be equipped with scintillation detectors. They may be located at the windows 2 and 2a and measure the time of flight for each muon passing the system. The knowledge of the time of flight helps to estimate the muon velocity.

Alternatively drift chambers can be implemented for muon coordinate measurement in the present invention. The coordinate resolution in best muon detectors (such as drift tubes) can be as good as 50 micrometers.

Additionally, a scintillation fiber detector may be used for muon sensing. Such detector has a good spatial resolution. They can be made by forming layers of plastic optical fibers made out of scintillator material coated with a lower refractive index cladding. These can typically have a diameter of 0.5 to 1 mm. The small size of each independent scintillator means that many readout channels (typically tens of thousands) are required, and it is not practical to equip each one with its own photomultiplier. One solution to this is to gather the fibers into a bundle and connect to an image intensifier. This amplifies the light while maintaining an image, which can then be viewed with a CCD camera, and the position on the image associated with a particular fiber.

Since other particles are stimulating the detector as well, a system of two detectors was proposed to avoid false muon detection. Other particles originating from i.e. terrestrial radiation will also cause stimulation, but those particles disappear after passing the short distance, because they are absorbed by nuclear interactions. The detection that occurs almost instant in both detectors is considered as a successful detection of a muon. Muons shielding is not limited to above mentioned additional detector; any other types of shielding can be in order to separate muons from other charged particles.

A sandwich of two coordinate detectors located along the muon path allows simultaneous detecting both the incident angle of the muon and its locations.

It is known that muons easily penetrate most of the materials, because they have only electromagnetic interactions. However an increase of the muon deflection due to Coulomb scattering is observed when they pass materials with high atomic number Z such as nuclear or gamma-ray-shielding materials, Two materials that can be used to make an atomic bomb: plutonium-239 and highly enriched uranium with at least 20 percent of uranium-235. Since both materials have high Z numbers, both can be detected by muon technique. Probability of muon deflection angle forms a Gaussian distribution with a zero mean angle and a width that depends on the material Z number. While muon deflection in 10 cm of aluminum is up to about 10 milliradians, it reaches a value of about 80 milliradians in uranium and plutonium.

Current technologies for nuclear material detection are limited to X-ray and Gamma ray equipment. Both systems must be accurately handled, and their emissions properly controlled. There is a need for reliable and safety system to unveil hidden nuclear materials. Muon detection technique provides a safety alternative with improved penetration ability. The present invention is a continuation-in-part of U.S. patent application Ser. No. 11/626,920, which discloses a system and method for nuclear material detection using muons; this patent application is fully incorporated herein by reference. Since cosmic muons are not monoenergetic, the distribution of the scattering angle depends on the muon energy, the atomic number Z of the material, and the thickness of materials traversed by the muon. There is a need to take into account the distribution of muons' energies when an observation of muon scattering caused by high Z material is performed. A method and system for taking into account the low energy muons contribution into the final measurement result was discussed in details in U.S. patent application Ser. No. 11/947,058 by the same inventors as the present invention; it is fully incorporated herein by reference. There is a need to improve the detection sensitivity and reliability by further optimization of the muon detectors and the system modification for enhanced sensitivity to the high energy muons.

SUMMARY OF THE INVENTION

The system and method are disclosed for nuclear materials detection by muon flow sensing. The system comprises a series of muon detectors for efficiently measuring muons deflection caused by the presence of high Z materials. The presence of high Z material is suspected inside the interrogated volume when an average deflection of multiple muons, registered by the system, is above some predetermined value. The muon deflection is calculated taking into account the muon velocity measured in a velocity measurement unit. In the preferred embodiment a distribution width of muon trajectory angles is measured and compared with an expected width, which will be in absence of high Z material. The expected distribution width is calculated using modified Moliere formula. A criterion for a positive detection of the high Z material is a difference between the actual (measured) and the expected statistics of muon angles. When it exceeds a predetermined difference value, the presence of high Z material is suspected.

The predetermined difference value depends on a measurement time. In the preferred embodiment the measurement time is at least one minute. In one embodiment the predetermined difference value provides probability of positive detection above 90%. In another embodiment the predetermined difference value is 1 mrad.

The muon velocity measurement unit may operate separately from the muon deflection measurement. Alternatively, the velocity measurement unit may be combined with the coordinate and incidence angle measurement unit. In the preferred embodiment the muon velocity measurement unit is positioned below the coordinate and angle measurement detectors. In one embodiment a threshold Cerenkov counter is implemented for rejection of the contribution of muons with energies above some predetermined threshold to improve the signal-to noise ratio of the detection. In another embodiment a ring Cerenkov counter is implemented to measure the high energy muon velocity, which allows adding correctly the contribution of these muons and improve the signal-to noise ratio of the detection. In yet another embodiment, a transition radiation detector is implemented for measuring the velocity of the fastest muons, which is difficult to measure by Cerenkov detectors. The data from the transition radiation detectors is taken into account for further improvement of the signal-to-noise ratio.

In one embodiment, a contribution of muons having the velocity larger than a first predetermined velocity value and a contribution of muons having the velocity lower than a second predetermined velocity value are eliminated from consideration by the digital signal processing unit when determining the presence of high Z material in the system. The first predetermined velocity value may correspond to muon momentum of 10 Gev/c); and the second predetermined velocity value may correspond to muon momentum of 0.7 Gev/c).

In the preferred embodiment, the system comprises an angular measuring unit for angular measurement of the muon trajectory with an accuracy of at least 1 mrad.

In the preferred embodiment the system includes a unit for measuring a transit time for each particular muon entering the system, for example, scintillation counter.

Another object of the present invention is a method for high Z material revealing, comprising continuously measuring an incident angle of each incoming muon by a first detector; estimating an expected statistics of an expected leaving angle at a second detector for each incoming muon; continuously measuring an actual leaving angle for each incoming muon by the second detector; storing a data on the incident, the actual and the expected leaving angles; calculating an actual statistics of the actual leaving angle; finding a difference between the expected and the actual statistics; and determining a presence of high Z material in between the first and the second muon detector when the difference exceeds a predetermined difference value. The expected leaving angle is calculated taking into account the muon velocity measured by the velocity unit. The possible device for the muon velocity measurement include the ring Cerenkov counter, the transition radiation detector, the threshold Cerenkov counter and others.

In the preferred embodiment the method also includes eliminating a portion of muons with velocities above a first predetermined value and a portion of muons with velocities below a second predetermined value from further data processing

DETAILED DESCRIPTION OF THE PREFERRED EMBODIMENT

The present invention now will be described more fully hereinafter with reference to the accompanying drawings, in which the preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In one embodiment of the present invention, the muon detectors are the wire detectors similar to described above with the gratings make an anode, one above and one below the wires, while the wires make an anode. The gratings are printed strips, not wires, and the anode wires are spaced closer than the strips. The combination of a very thin (typically 50 microns) wire yielding a very high electrostatic field near the wire, very dense spacing of wires (typically 1.5 mm), critical choice of the gas mixture which must be as easily ionisable as possible (for example, a critical mix of n-pentane and $CO_2$), but not causing a spark, and the highest anode voltage which does not immediately cause a spark, is what produces at the end a measurable charge. The strips are critical for sampling the distribution of the opposite (positive ions, thus strips are cathodes) induced charge on an otherwise flat cathode plane. This sampling provides us the exact location of the ionization using a specially designed numerical algorithm (software).

Figure 1:
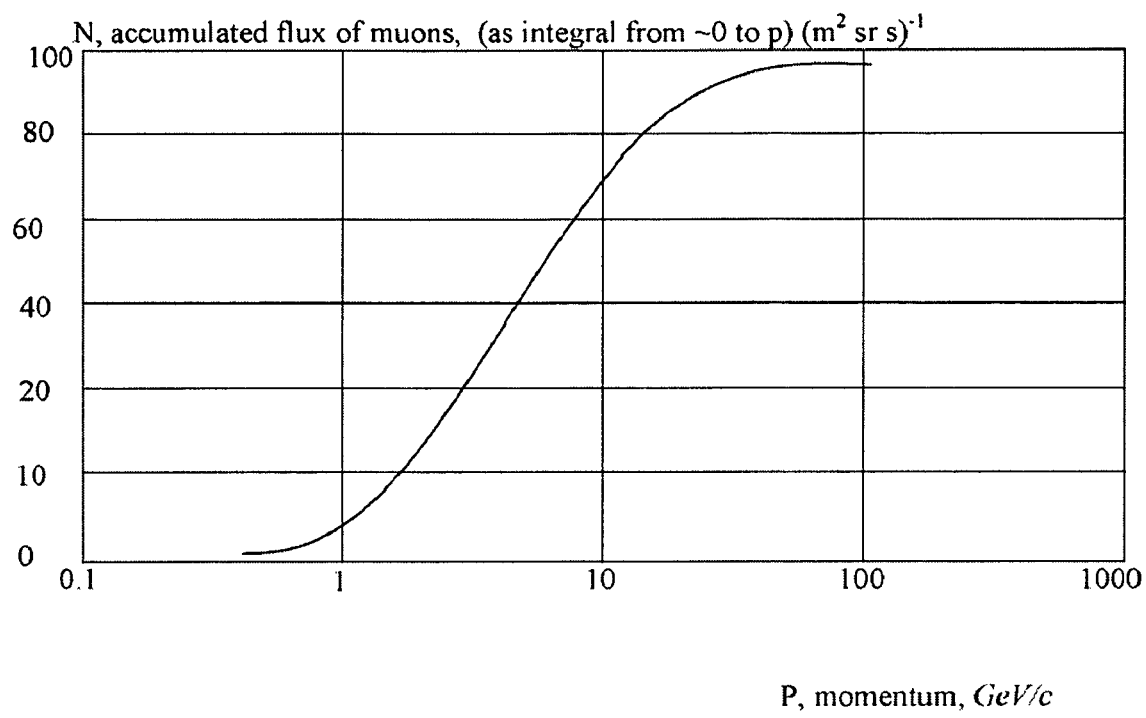
FIG. 1 Momentum distribution of atmospheric muons.
Figure 2:
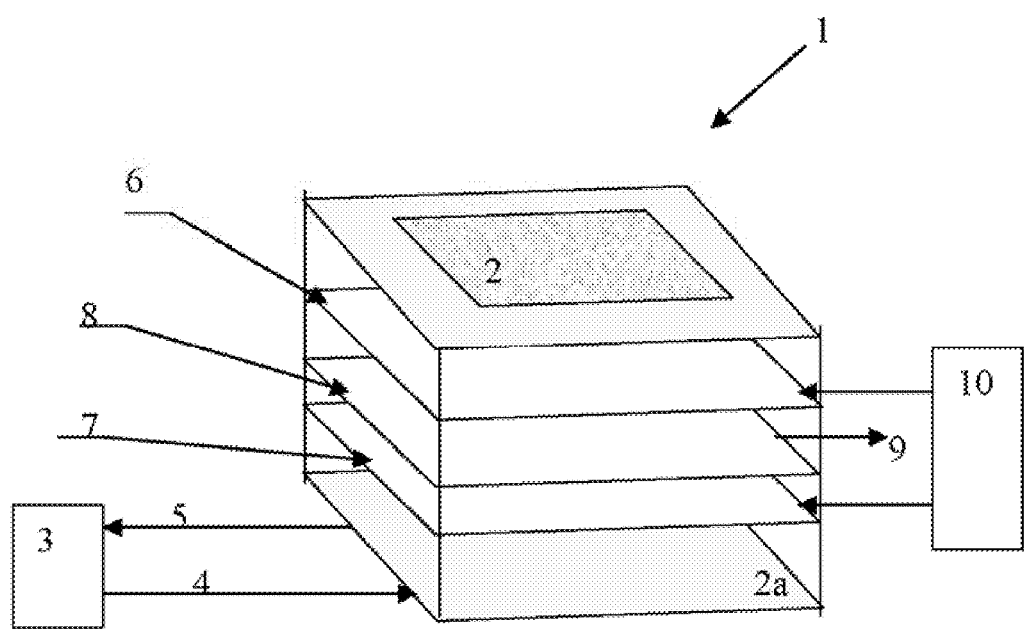
FIG. 2 A muon detector for coordinate measurement.
Figure 3:
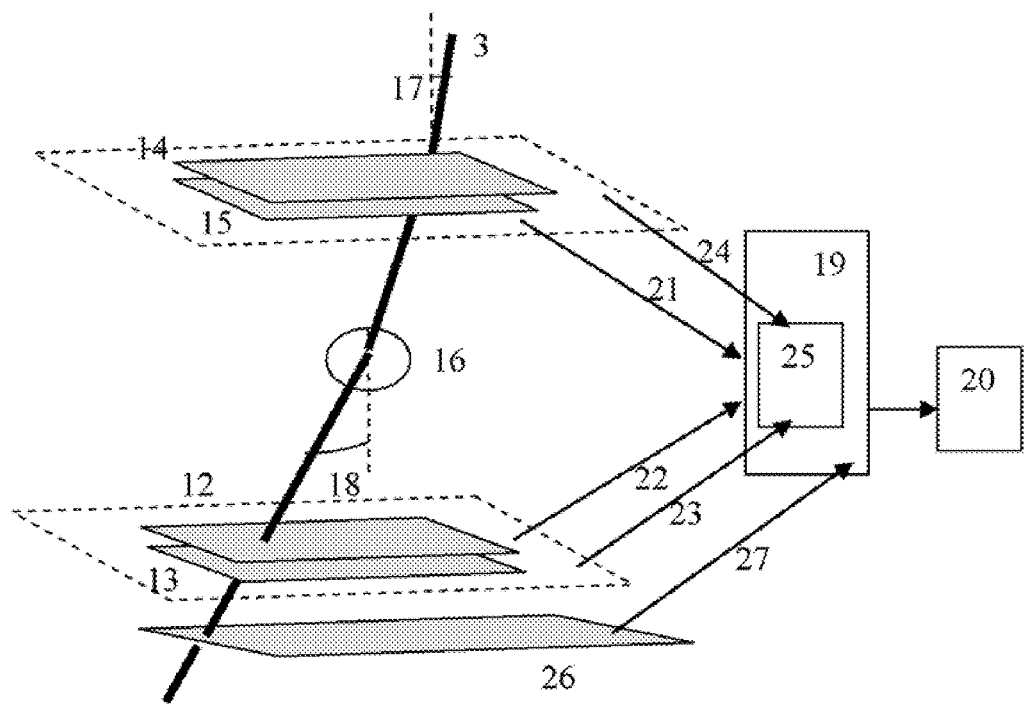
FIG. 3 A system for measurement of muon deflection caused by high Z material.

In one embodiment of the present invention, a system for high Z material detection is proposed as shown in FIG. 3. In the preferred embodiment two detectors 12 and 13 are positioned below the interrogated area, for example, on the ground or under the ground. Similar muon detectors 14 and 15 are positioned above the ground level. Each group of the detectors 12, 13 and 14, 15 allows measuring the muon incidence angle with an accuracy of at least 1 milliradian and muon coordinate with an accuracy of at least 1 millimeter. In the absence of high Z material between upper and tower detectors the muon incidence angle is the same as its leaving angle. In the presence of high Z material 16 a muon deflection is observed. The incidence angle 17 at the top sensor 14, 15 differs from the leaving angle 18 at the bottom sensor 12, 13. In fact the muon deflection is more complicated multiscattering process, and FIG. 3 represents a simplified case. Each sensor constantly registers flow of muons passing through. The coordinate and incidence angle for each muon are measured at the top sensor 14, 15. These data is used in a Digital Signal Processing (DSP) unit 19 to calculate the expected muon coordinate and leaving angle at the bottom sensor 12, 13. The expected coordinate and leaving angle are calculated assuming absence of high Z material between the top and the bottom detectors. In the preferred embodiment the expected coordinate and leaving angle are calculated taking into account the muon velocity, measured by a muon velocity measuring unit 26. (The detailed description of the velocity unit is provided below.) An actual coordinate and leaving angle are compared with the expected ones. A statistical parameter associated with the actual measurement is compared with the same statistical parameter of the expected data. An alarm system 20 generates an alarm if a deviation between the actual and expected data exceeding a predetermined difference value is observed. In the preferred embodiment the statistical parameter is the angle distribution width, and the predetermined difference value is about 1 milliradian. The predetermined difference value that triggers the alarm depends on an exposure time T. The longer time T allows achieving higher probability of a positive detection. In the preferred embodiment the exposure time is at least one minute. In one embodiment the predetermined different value is chosen to provide the probability of the positive detection above 90%. The predetermined difference value also depends on geometrical parameters of the system and a type and size of object under investigation. A predetermined trigger value of deviation may be chosen from 0.1 to 100 milliradian. In the preferred embodiment the predetermined trigger value of the deviation is 1 milliradian. Large size muon detectors are preferable for the disclosed system. For example, a muon detector of at least 1 square meter size must be used to detect hidden nuclear materials in cargo. The distance between the first and the second muon detectors may be from 10 cm to 5 meters.

Figure 4:
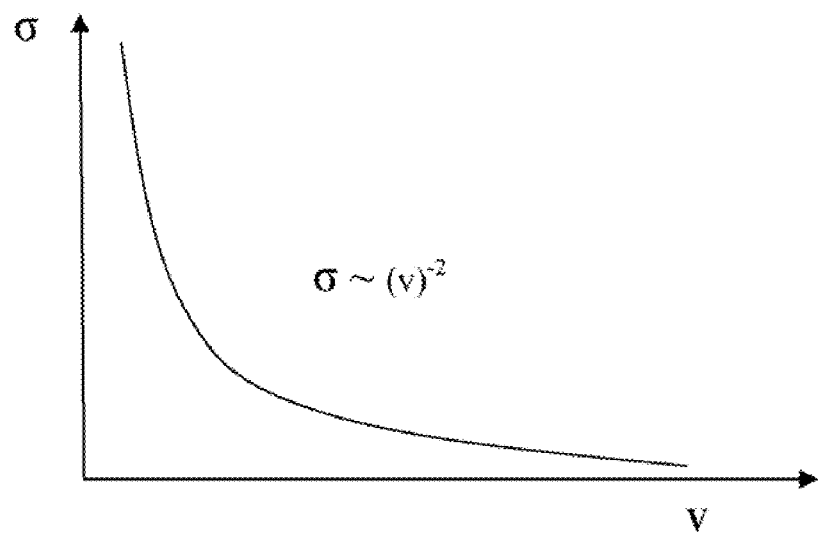
FIG. 4 The width of muon deflection angle vs. the muon velocity.

While a muon traverses high-Z material, it experiences electrical interaction with the material atoms and undergoes a large number of electromagnetic scattering. The probability distribution of the resulting deflection angle is characterized by a width σ in three-dimensional space, $\sigma^2 = \sigma_1^2 + \sigma_2^2$, where $\sigma_1$ and $\sigma_2$ are the plane projections The width is expressed by modified Moliere formula as following (FIG. 4):

$$\sigma^2 = (0.015/vP)^2 \, (X/X_0) \, [1 + 0.12 \log(X/X_0)]^2$$

where X is the thickness traversed, P the momentum and v the velocity of the muon, and radiation length $X_0$ is a characteristic of the traversed material, equal to 300 m for air, 9 cm for Aluminum, 1.8 cm for Iron, 0.56 cm for Lead, 0.32 cm for Uranium. The width σ is in inverse proportion to the squared velocity as shown in FIG. 4. Obviously, slow muons experience a large scattering on various types of materials, and this effect must be taken into consideration.

In one embodiment the distribution width dependence on the muon velocity is taken into account, when the measurement data is processed in the DSP unit 19. The amount of muons with energy below 1 GeV is about 25% in the atmospheric flow, therefore it is important to take into account the deflection dependence on the muon velocity into the final calculations to improve the system accuracy and reliability. In another embodiment, the contribution of slow muons with energy below 0.7 GeV is eliminated from the final calculations to avoid false alarms of the system.

Figure 5:
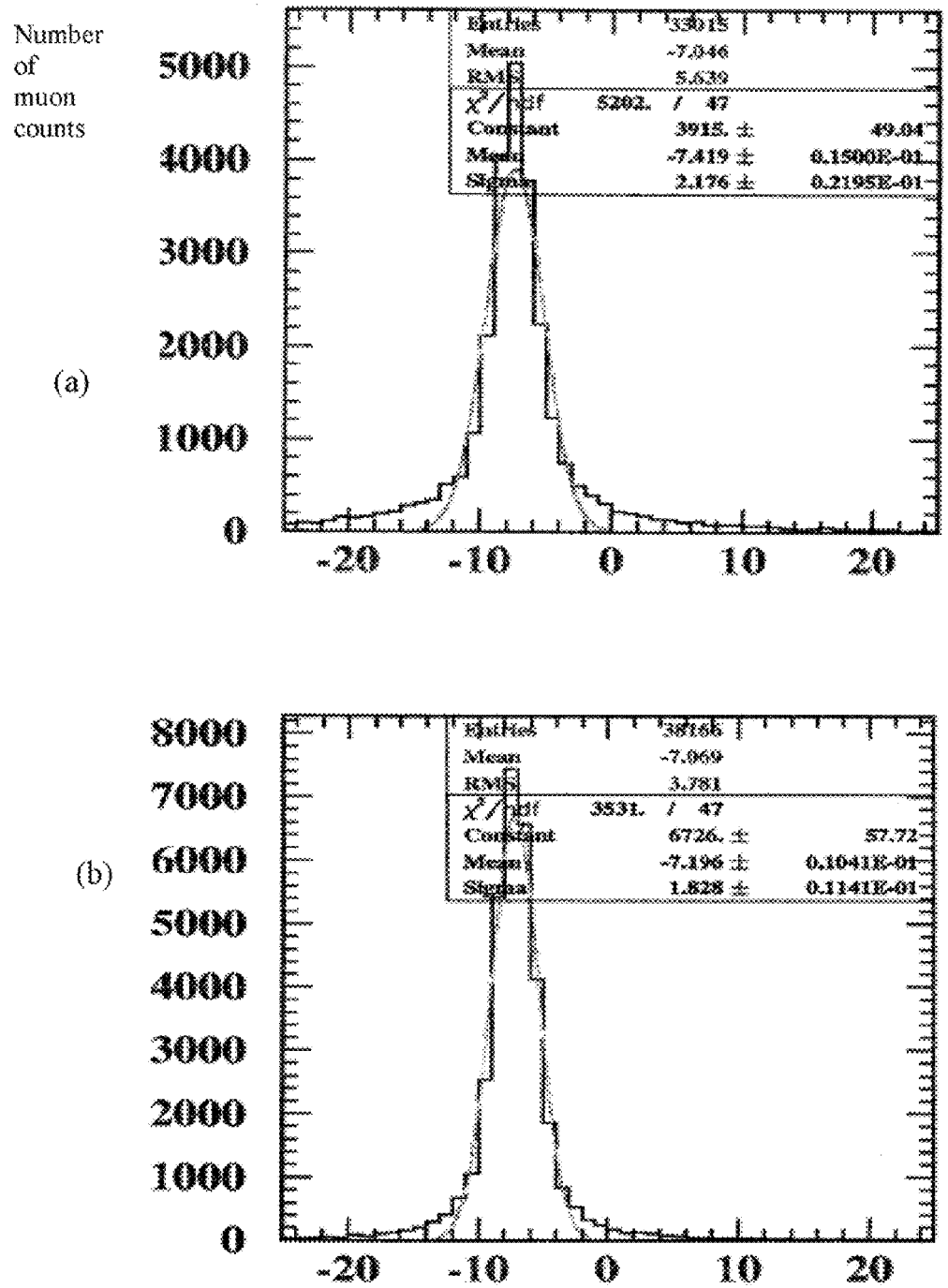
FIG. 5 Experimental results of muon deflection in the system (a) with lead, and (b) without lead in between the detectors.

Low-energy muons may produce false positive signals, i.e. large scattering in materials, even in absence of high Z substance. High-energy muons may be deflected at rather small angles, but still can provide important data on the high-z material presence inside the interrogated volume. The width of the angles distribution vs. the muon time of flight between the upper and lower detectors is shown in FIG. 5. An estimation of the muon energy is carried out basing on measuring the muon transit time between upper 14, 15 and lower 12, 13 detectors. The actual transit time is measured using pulses generated by a clock associated with scintillation counter 2. Counting is started by a signal produced by the muon passing through the top detector and stopped by a signal in the scintillation counter at the bottom detector. Both signals from the upper and lower detectors are transmitted via channels 23 and 24 (FIG. 3) into a time measuring unit 25, which is a part of the DSP unit 19. The time of flight depends on the system parameters: the total distance between the upper and lower detectors, the scintillation counter jitters and the scintillation counter performance vs. the speed of the clock. In one of the embodiments a scintillator BC422Q from Saint Gobain, Valley Forge, Pa. with response within 0.7 ns was implemented.

A variety of charged particles triggers the detectors 14 and 15. Some particles with a very low energy level do not get in touch with the detector 15. Particles with higher energy level can reach the lower set of the detectors 12, 13. Only those particles that were registered by all four detectors 12, 13, 14, and 15 are processed in the digital signal processing unit 19. The system of four detectors automatically performs muon selection since other particles do not possess enough energy to penetrate all four detectors.

Since low-energy muons may provide false information on the presence of high-z material by providing data with relatively large deflection angles, in one embodiment the contribution of muons having energies below 0.7 Gev/c were excluded from the final calculations.

FIG. 5 represents the experimental results that demonstrate the system performance. FIG. 5 (a) presents the experimental results of the deflection angle measurement when a thick layer of lead was placed in between the upper and lower detectors. Similar measurements without lead are shown in FIG. 5 (b). The increase of RMS (root mean square) from 3.7 to 5.6 mrad is observed.

Velocity measurement for very fast muons requires technique that is different than the described above. In the preferred embodiment the velocity measuring unit 26 is positioned below the coordinate measuring detector 12, 13 and operates independently. However any other location of the velocity measuring unit is possible as long as it is on the muon way. The information from the unit 26 is transferred to the digital signal processing unit 19, and the expected leaving angle is calculated using this data from the unit 26.

In one embodiment a threshold Cerenkov counter is implemented for rejection of the contribution of muons with energies above some predetermined threshold to improve the signal-to noise ratio of the detection.

Cerenkov radiation is emitted when a charged particle, for example, muon, speed exceeds the speed at which light is propagating in a dielectric medium through which it passes. The velocity that must be exceeded is the phase velocity rather than the group velocity. As a charged particle travels, it disrupts the local electromagnetic field (EM) in its medium and the medium electrons in the atoms become displaced. Photons are emitted as an insulator's electrons restore themselves to equilibrium after the disruption has passed, In normal circumstances, these photons destructively interfere with each other and no radiation is detected. However, when the disruption travels faster than light is propagating through the medium, the photons constructively interfere and intensify the observed radiation. The speed at which the photons travel does not change; it is equal to the speed of light. The light appears to travel more slowly while traversing a medium due to the frequent interactions of the photons with the matter.

Figure 6:
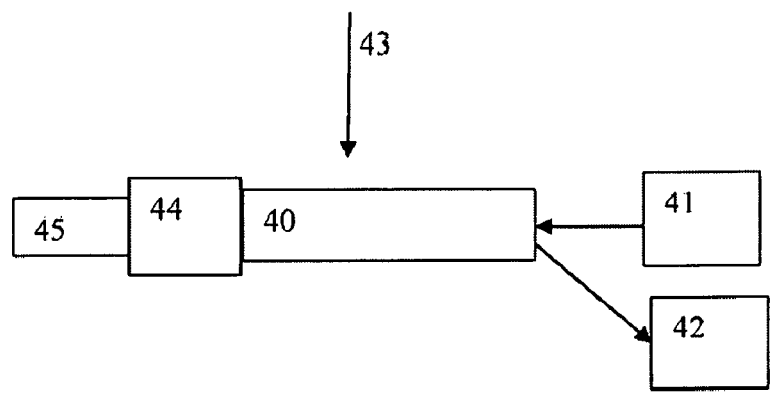
FIG. 6 A threshold Cherenkov counter operation.

The threshold Cerenkov counter can be implemented as a chamber 40 with gas under pressure controlled by a pump 41 as shown in FIG. 6. The gas pressure is measured by a manometer 42, the gas pressure controls the index of refraction of the medium. The chamber is positioned essentially perpendicular to the muon flow 43. When the velocity of a muon is above the velocity of light in the medium, a light is irradiated in visible or UV spectral range. This light is collected by optical elements 44 and detected by a photomultiplier 45. Such threshold detector produces a signal for each muon with a velocity higher than a threshold set by the pressure. Basing on the threshold detector signal, the high energy muons contribution can be eliminated from the calculations when the probability of of the high Z material presence is determined.

Figure 7:
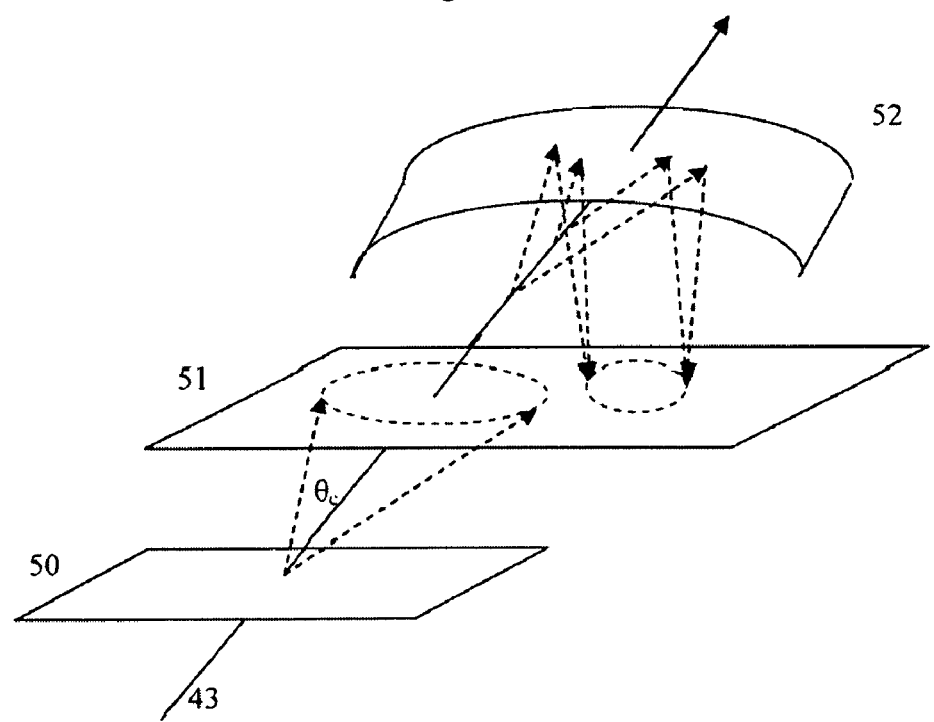
FIG. 7 A ring Cherenkov counter operation.

In another embodiment a ring Cerenkov counter is implemented to measure the high energy muon velocity, which allows adding correctly the contribution of these muons and improve the signal-to noise ratio of the detection. The ring Čerenkov counter allows measuring the muon velocity by an indirect measurement of the Cerenkov angle, $\theta_c$, i.e. the angle between the emitted Čerenkov radiation and the muon path (FIG. 7). This is related to the velocity by $\cos\theta_c = c/nv$, where c is the speed of light and n is the refractive index of the medium. Particles pass through a radiator 50, the radiated photons may be directly collected by a position-sensitive photon detector 51. Alternatively, the photons are focused by a mirror 52 onto the detector 51. Respectively, these are called direct focusing or mirror-focused ring Čerenkov detectors. For direct focusing, radiators have to be kept thin (e.g. a liquid Tetradecafluoro(2-methylpentane) $C_6F_{14}$ radiator), to avoid broadening the ring or filling it. For mirror-focused scheme, gaseous radiators, such as Dodecafluoropentane C5F12 may be used. For photon detection one uses thin photosensitive (an admixture of e.g. triethylamine to the detector gas) proportional or drift chambers.

Though high energy muons are deflected at relatively small angles, their contribution can be added into signal, if their velocity is known. In yet another embodiment, a transition radiation detector is implemented for measuring the velocity of the fastest muons, which is difficult to measure by Cerenkov detectors. The data from the transition radiation detectors is taken into account for further improvement of the signal-to-noise ratio. The transition radiation detector is made of a sandwich of alternating layers of two insulating materials with different electrical properties. When muon passes this multilayer structure a light is generated at each layer boundary. At each interface between materials, the probability of transition radiation increases with the relativistic gamma factor. Thus particles with large γ give off many photons, and small γ give off few. In total the intensity of the generated light is proportional to the muon energy.

In one embodiment the suspicious container or vehicle is placed in between the top and the bottom detectors, and the muon deflection is measured. Alternatively the measurement is performed when a vehicle with the container moves through the system of detectors.

The muon detectors may be manufactured being hidden or camouflaged in the environment. The bottom sensor or U-shaped system of sensors may be positioned under the ground.

Obviously, the system may not be limited by one muon detector. In one embodiment, the system includes multiple muon detectors combined with the velocity measurement units. The data from all sensors enters digital signal processing (DSP) unit, where the expected trajectory of each particular muon is calculated and compared with the measured result. In one embodiment the results of the data analysis are shown on display. The system may also include an alarm. If the deviation of the measured parameter differs from the calculated one more than a predetermined value, the alarm starts; it may be audible or visual alarm.

Security check point with muon detector may be combined with other sensor equipment.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

The system can be installed on roads, in tunnels, in cargo station, in seaports and other locations. Toll stations could be convenient places for installations of such nuclear material detectors. The similar system of sensors may be installed at luggage transportation conveyor.

The invention claimed is:

1. A system for a high Z material detection, comprising:
    at least a first muon detector and a second muon detector, the first muon detector is indicative of an incidence angle, and the second muon detector is indicative of an actual leaving angle for each muon passing the system;
    a muon velocity measurement unit, measuring a velocity for each incoming muon,
    a digital signal processing unit for storing a data on the incidence, the actual leaving angle and the velocity for muons passing the system during an exposure time T;

calculating an actual statistics of the actual leaving angles being dependent on the muon velocity and an expected statistics of expected leaving angles, wherein the expected statistics of the expected leaving angle is estimated assuming absence of the high Z material in between the first and the second muon detector;

finding a difference between the actual and the expected statistics; and determining a presence of the high Z material inside the system when the difference is above a predetermined difference value.

2. The system according to claim 1, further comprising the muon velocity measurement unit operating separately from the muon incidence angle and leaving angle measurement.

3. The system according to claim 1, wherein the muon velocity measurement unit is positioned below the second muon detector.

4. The system according to claim 1, wherein the muon velocity is measured using a ring Cherenkov counter.

5. The system according to claim 1, wherein the muon velocity is measured using a transition radiation counter.

6. The system according to claim 1, wherein the muon velocity is estimated using a threshold Cerenkov counter.

7. The system according to claim 1, wherein the actual statistics and the expected statistics are an actual and expected distribution widths.

8. The system according to claim 6, wherein the expected distribution width is calculated using modified Moliere formula.

9. The system according to claim 2, wherein the predetermined difference value is at least 1 mrad.

10. The system according to claim 1, wherein the predetermined difference value providing probability of a positive detection above 90%.

11. The system according to claim 1, wherein the first and the second muon detectors each comprises an angular measuring unit for angular measurement of a muon trajectory with an accuracy of at least 1 mrad.

12. The system according to claim 1, wherein a contribution of muons having the velocity larger than a first predetermined velocity value and a contribution of muons having the velocity lower than a second predetermined velocity value are eliminated from consideration by the digital signal processing unit when determining the presence of high Z material in the system.

13. The system according to claim 12, wherein the first predetermined velocity value corresponds to muon momentum of 10 Gev/c).

14. The system according to claim 12, wherein the second predetermined velocity value corresponds to muon momentum of 0.7 Gev/c).

15. The system according to claim 1, wherein the first and the second muon detectors each comprises a scintillator counter for measurement of a time of flight for each muon passing each detector.

16. A method for high Z material revealing, comprising:
continuously measuring an incident angle and velocity for each incoming muon;

continuously measuring an actual leaving angle for each incoming muon by the second detector;

estimating an expected statistics of an expected leaving angle and an actual leaving angle statistics of the actual leaving angle being dependent on the muon velocity for each incoming muon;

storing a data on the incident, the actual and the expected leaving angles;

calculating an actual statistics of the actual leaving angle;

finding a difference between the expected and the actual statistics; and determining a presence of high Z material in between the first and the second muon detector when the difference exceeds a predetermined difference value.

17. The method according to claim 16, further comprising:
measuring the muon velocity using a ring Cerenkov counter.

18. The method according to claim 16, further comprising:
measuring the muon velocity using a transition radiation detector.

19. The method according to claim 16, further comprising:
measuring the muon velocity using a threshold Cerenkov counter.

20. The method according to claim 16, further comprising:
eliminating a portion of muons with velocities above a first predetermined value and a portion of muons with velocities below a second predetermined value from further data processing.

* * * * *